United States Patent
Ooe et al.

(10) Patent No.: US 6,939,517 B2
(45) Date of Patent: Sep. 6, 2005

(54) NITROGEN OXIDE REDUCING SYSTEM FOR DIESEL ENGINE AND NITROGEN GAS GENERATING DEVICE

(76) Inventors: Toshiaki Ooe, 4260-5, Kita-cho, Takamatsu-shi, Kagawa 760-0080 (JP); Takanori Iima, 627-3, Shinzaikawakubo-cho, Takamatsu-shi, Kagawa 761-8003 (JP)

(*) Notice: Subject to any disclaimer, the term of this patent is extended or adjusted under 35 U.S.C. 154(b) by 770 days.

(21) Appl. No.: 09/781,419

(22) Filed: Feb. 13, 2001

(65) Prior Publication Data
US 2002/0031454 A1 Mar. 14, 2002

(30) Foreign Application Priority Data
Jul. 25, 2000 (JP) ......................... 2000-224642

(51) Int. Cl.⁷ ............... B01D 53/56; B01D 53/90
(52) U.S. Cl. ............... 422/172; 422/168; 422/305; 422/110; 422/113
(58) Field of Search ............... 422/168, 169, 422/171, 172, 305, 110, 113; 123/37.47, 37.88

(56) References Cited

U.S. PATENT DOCUMENTS 5,649,517 A 7/1997 Poola et al.
6,067,973 A 5/2000 Chanda et al.
6,173,567 B1 * 1/2001 Poola et al. ............... 60/274

FOREIGN PATENT DOCUMENTS

| JP | 49-77029 | 7/1974 |
| JP | 61-204955 | 12/1986 |
| JP | 1-125555 | 5/1989 |
| JP | 2-18608 | 2/1990 |
| JP | 9-47629 | 2/1997 |
| WO | WO 99/42709 A1 | 8/1999 |

OTHER PUBLICATIONS

Patent Abstracts of Japan, vol. 014, No. 478, (M–1036) Oct. 18, 1990, JP 02–191859 (Jul. 27, 1990).

* cited by examiner

*Primary Examiner*—Samuel M. Heinrich
(74) *Attorney, Agent, or Firm*—Foley & Lardner LLP

(57) ABSTRACT

A nitrogen oxide reducing system of a diesel engine can reduce nitrogen oxide contained in an exhaust gas of the diesel engine and whereby cab adapt to a restriction. At a tip end of a mixer, air holes required by the engine are formed, a nitrogen gas generating device for increasing concentration of nitrogen in the air is mounted to introduce nitrogen into the mixer, the mixer is mounted to the induction opening of the engine at opposite side of the air hole to introduce increased amount of nitrogen to prevent oxidation of nitrogen and discharge nitrogen.

16 Claims, 6 Drawing Sheets

NITROGEN OXIDE REDUCING SYSTEM FOR DIESEL ENGINE AND NITROGEN GAS GENERATING DEVICE

BACKGROUND OF THE INVENTION

1. Field of the Invention

The present invention relates generally to a nitrogen oxide reducing system for a diesel engine and a nitrogen gas generating device for reducing a nitrogen oxide in an exhaust gas by adjusting a nitrogen concentration in induction air. More particularly, the present invention relates to a system for preventing oxidation of nitrogen by mounting a nitrogen gas generating device on a mixer for mixing air in the mixer with nitrogen supplied from the nitrogen gas generating device for increasing nitrogen concentration.

2. Description of the Related Art

Currently, as a part of environment protection policy, restriction for discharge of exhaust gas from a diesel engine for suppressing air pollution is becoming more and more strict year by year. Particularly, even in a large size diesel engine to be employed in a special purpose vehicle, such as a construction machine, industrial machine or the like, severe regulation is being about applied.

Conventionally, as one of causes of air pollution, various proposals have heretofore been made for reducing nitrogen oxide contained in the exhaust gas of the diesel engine.

As one of the proposals, so-called exhaust gas recirculation (EGR) to recirculate a part of exhaust gas to induction air to lower combustion temperature to restrict generation of nitrogen oxide, has been widely known.

On the other hand, as disclosed in Japanese Patent Application Laid-open No. 2(1990)-191859, there has been disclosed an air induction system of the diesel engine including a separator having an oxygen selective transmission wall having an oxygen separating function, a device for sucking oxygen rich air via the oxygen selective transmission wall of the separator, and means for sucking air having low oxygen concentration upstream of the oxygen selective transmission wall in a partial load condition to the engine, adjusting oxygen concentration of suction air depending upon driving conditions for restricting combustion in the partial load condition of the engine for reducing generation of nitrogen oxide.

Furthermore, a system for removing nitrogen oxide by means of a catalyst has also be proposed.

However, among the prior arts, the exhaust gas recirculation system introduces the exhaust gas per se into the induction air so that particulates, sulfur oxide and so on contained in the exhaust gas are inherently introduced into the engine to degrade a lubricant oil and to accelerate wearing of sliding portions in the engine. Therefore, in view of durability and combustion ability of the engine, it should be a problem to perform exhaust gas recirculation in a sufficient amount for restricting generation of nitrogen oxide. Therefore, in the diesel engine having the exhaust gas recirculation system, non of the system has been successfully adapted to the current regulation.

On the other hand, in the air induction system for the diesel engine as disclosed in Japanese Patent Application Laid-Open No. 2 (1990)-191859, problems in the exhaust gas recirculation will not be encountered since the oxygen rich air is sucked through the oxygen selective transmission wall of the separator by a suction pump and air having low oxygen concentration as removed oxygen is sucked into the engine, and the exhaust gas per se is not introduced into the induction air.

However, oxygen molecule transmission hole of the oxygen selective transmission wall formed from oxygen enrichment membrane using high molecular material, is in an order of micron. Therefore, even though oxygen is sucked by means of the suction pump utilizing negative pressure, since transmission resistance of the oxygen molecule is large and sufficient pressure difference cannot be obtained by the suction pump utilizing negative pressure, a sufficient amount of induction air, oxygen concentration of its low enough to restrict generation of nitrogen oxide, is practically impossible to instantly obtain in a distance of short separator forming a part of the suction passage. As a result, it has been practically impossible to introduce a sufficient amount of induction air with low oxygen concentration sufficient for restricting generation of nitrogen oxide without causing lowering of engine output, and thus is impractical. Therefore, it is clear that restriction cannot be satisfied in this system.

Furthermore, the system employing a catalyst cannot achieve sufficient effects. Therefore, currently, no system can satisfy the current restriction value.

SUMMARY OF THE INVENTION

It is an object of the present invention to solve the problems in the prior art set forth above and to provide a nitrogen oxide reducing system of a diesel engine which can reduce nitrogen oxide contained in an exhaust gas of the diesel engine, thereby adapting to restrictions.

Another object of the present invention is to provide a nitrogen gas generating device suitable for use in such nitrogen oxide reducing system for the diesel engine.

It is almost impossible to remove once nitrogen in the air is introduced into a combustion chamber and is converted into nitrogen oxide.

Particularly, in accordance with an aspect of the present invention, there is provided a nitrogen oxide reducing system for a diesel engine comprising:

a mixer provided in an induction passage of the diesel engine; and a nitrogen gas generating device supplying a pressurized nitrogen gas of more than or equal to a predetermined concentration in a predetermined amount relative to an intake air flow rate.

With the construction set forth above, since the pressurized nitrogen gas in a concentration greater than or equal to a predetermined concentration is supplied in a predetermined amount with respect to the intake air flow rate, is supplied to the mixer provided in the air induction passage. Therefore, unlike the conventional system of exhaust gas recirculation or supplying low oxygen concentration air utilizing negative pressure, a sufficient amount of clean nitrogen gas can be supplied to restrict discharge amount of nitrogen oxide in a range less than or equal to a restriction value.

Here, the nitrogen gas generating device may be a nitrogen gas cylinder filled with nitrogen gas at a predetermined pressure or a psa type nitrogen gas generator.

In this case, unlike a diesel engine mounted on a vehicle, it is effective for a stationary engine used for power generation or the like.

With the construction set forth above, utilizing the compressor driven by the engine, the nitrogen gas of the concentration greater than or equal to the predetermined concentration can be obtained. Therefore, it is effective for a diesel engine to be mounted on a vehicle.

With the construction set forth above, even while the engine or the compressor is in an inoperative state, the predetermined pressure of the compressed air can be accumulated in the first pressure accumulation tank. Therefore, upon re-starting, the compressed air and thus the nitrogen gas can be obtained quickly.

With the construction set forth above, fluctuation of pressure and flow rate of the discharged nitrogen gas due to individual difference of the engine, compressor or the membrane unit, can be adjusted at a desired value. With the construction set forth above, since the pressure reduction valve is provided downstream of the nitrogen gas generator, the predetermined nitrogen gas flow rate can be obtained with maintaining the pressure in the nitrogen gas generator at the predetermined pressure.

With the construction set forth above, since the nitrogen gas can be accumulated in the second pressure accumulation tank at the predetermined pressure, the predetermined amount of the nitrogen gas can be stably supplied even upon occurrence of fluctuation of load on the engine.

With the construction set forth above, even during an inoperative state of the engine or the compressor, the predetermined pressure of the nitrogen gas can be accumulated in the second pressure accumulation tank, nitrogen gas can be quickly supplied to the engine upon re-starting.

With the construction set forth above, since the nitrogen gas flow rate can be controlled in response to variation of the intake air flow rate of the engine, an appropriate amount of nitrogen gas can be supplied adapting to the operating condition. Also, in comparison with supplying a constant amount, wasting of the nitrogen gas can be successfully prevented.

With the construction set forth above, special heating devices for the black smoke reducing device become unnecessary and black smoke can be reduced effectively.

According to another aspect of the present invention, there is provided a nitrogen gas generating device comprising: a compressor for compressing air; a first pressure accumulation tank accumulating compressed air at a predetermined pressure; and a nitrogen gas generator having a membrane unit having a plurality of hollow fiber membranes for selectively transmitting oxygen from the compressed air supplied from the first pressure accumulation tank for separation to discharge a nitrogen gas of greater than or equal to a predetermined concentration.

With the construction set forth above. by driving the compressor, the nitrogen gas of the concentration greater than or equal to the predetermined concentration can be obtained instantly. Thus, it is effective for mounting on a vehicle.

With the construction set forth above, even while the compressor is in an inoperative state, the predetermined pressure of the compressed air can be accumulated in the first pressure accumulation tank. Therefore, upon re-starting, the compressed air and thus the nitrogen gas can be obtained quickly.

With the construction set forth above, fluctuation of pressure and flow rate of the discharged nitrogen gas due to individual differences of the compressor or the membrane unit, can be adjusted at a desired value. This is advantageous in practice.

With the construction set forth above, the predetermined nitrogen gas flow rate can be obtained with maintaining the pressure in the nitrogen gas generator at the predetermined pressure.

With the construction set forth above, since the nitrogen gas can be accumulated in the second pressure accumulation tank at the predetermined pressure, the predetermined amount of the nitrogen gas can be stably supplied as required.

With the construction set forth above, even during an inoperative state of the compressor, the predetermined pressure of the nitrogen gas can be accumulated in the second pressure accumulation tank, nitrogen gas can be quickly supplied to the engine upon re-starting.

The above and other objects, effects, features and advantages of the present invention will become more apparent from the following description of embodiments thereof taken in conjunction with the accompanying drawings.

DESCRIPTION OF THE PREFERRED EMBODIMENT

Figure 1:
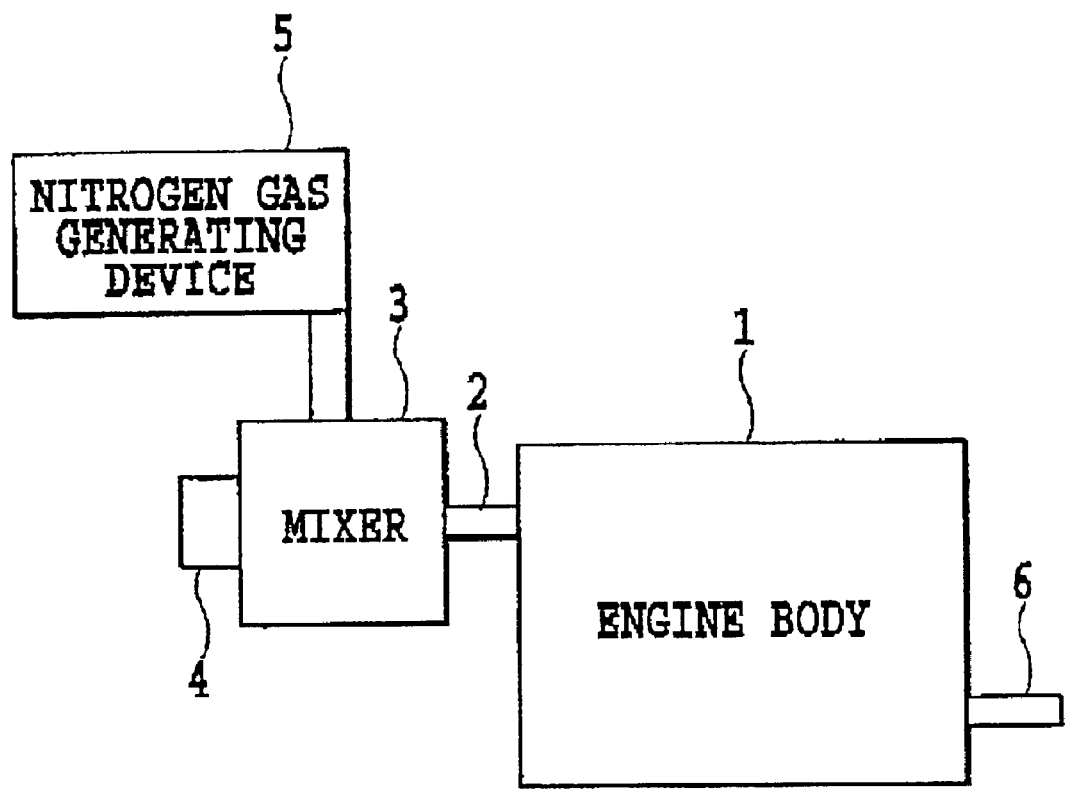
FIG. 1 is a block diagram showing a basic construction of a nitrogen oxide reducing system for a diesel engine according to the present invention.

FIG. 1 is a block diagram showing a basic construction of the present invention. Reference numeral 1 denotes an engine body, 2 denotes an air intake of the engine, 3 denotes a mixer communicated with the air intake 2 of the engine, 4 denotes an air inlet, 5 denotes a nitrogen gas generating device communicated with the mixer 3 and 6 denotes an exhaust passage of the engine.

Figure 2:
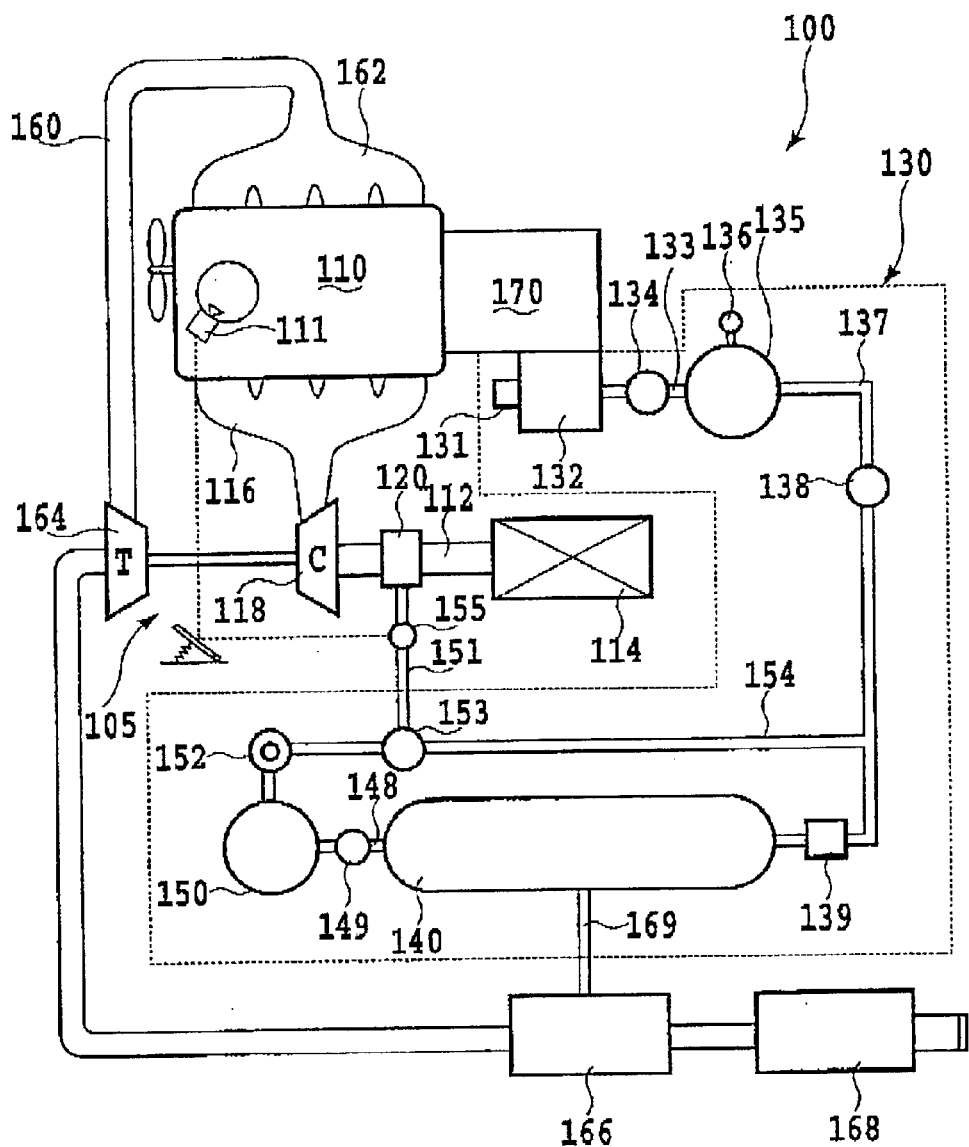
FIG. 2 is a block diagram showing more particular construction of the diesel engine including the nitrogen oxide reducing system according to the present invention.
Figure 3:
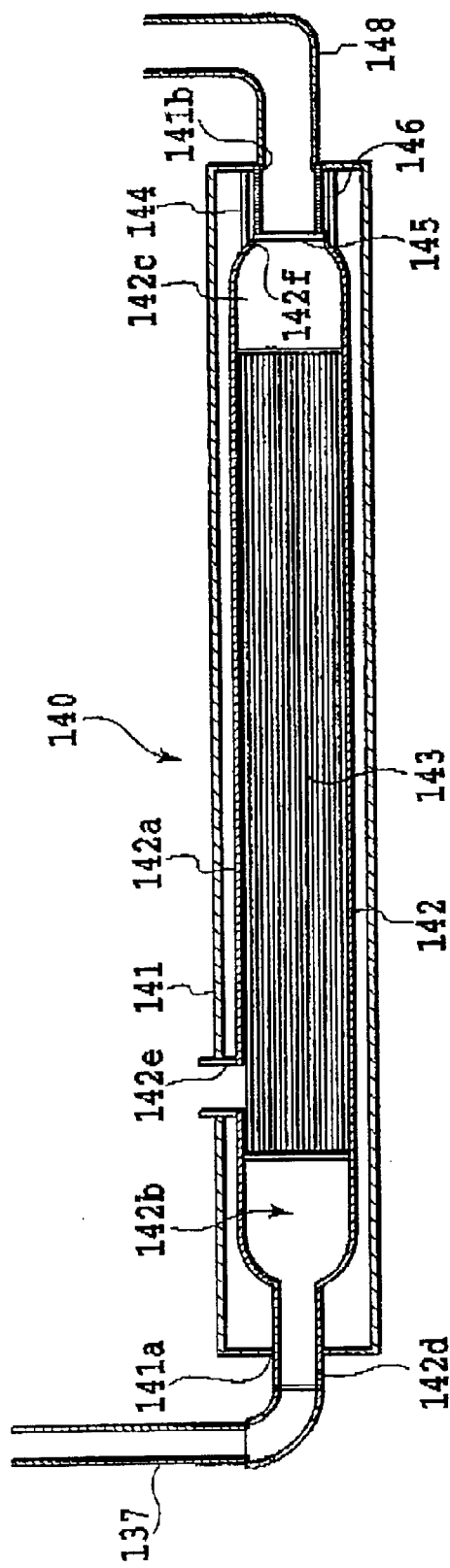
FIG. 3 is a section showing one embodiment of the preferred nitrogen gas generator employed in the nitrogen oxide reducing system according to the present invention.

FIG. 2 is a block diagram showing more particular construction of a diesel engine system 100 incorporating a nitrogen oxide reducing system according to the present invention. Reference numeral 110 denotes an engine body, 120 denotes a mixer provided in an air intake passage 112 of the engine, 130 denotes a nitrogen gad generating device connected to the mixer 120 through a passage 151 which will be discussed later.

In the air intake passage 112 of the engine, an air cleaner 114 is provided in the vicinity of an inlet and is communicated with the engine body 110 via an intake manifold 116. As shown In FIG. 2, it is convenient for providing the mixer 120 on upstream side of a compressor 118 in the engine provided with a turbocharger, when the present invention is applied to existing engines.

The shown embodiment of the nitrogen gas generating device 130 is mainly comprised of a compressor 132 generating compressed air as a compressed air generating device, a first pressure accumulation tank 135 accumulating the compressed air compressed by the compressor 132, a nitrogen gas generator 140 supplied with the compressed air at a predetermined pressure from the first pressure accumulation tank 135 and generating nitrogen gas, and a second pressure accumulating tank 150 accumulating the generated nitrogen gas.

In greater detail, an air cleaner 131 is provided at an inlet of the compressor 132. To a passage between the compressor 132 and the first pressure accumulation tank 135, a check valve 134 for preventing reverse flow from the first pressure accumulation tank 135 is provided. It should be noted that reference numeral 136 is a safety valve provided in the first pressure accumulation tank 135, which is opened when a pressure of the first pressure accumulation tank 135 exceeds a predetermined pressure Furthermore, in a passage 137 between the first pressure accumulation tank 135 and the nitrogen gas generator 140, an on-off valve 138 and a water drainage filter 139 are provided. The on-off valve 138 may be constructed as a pressure responsive valve which is opened when the pressure in the first pressure accumulation tank 135 exceeds the predetermined pressure, or as an electromagnetic valve which is opened in response to starting-up of the engine or the like. The water drainage filter 139 is for removing moisture content in the compressed air flowing through the passage 137 and is constructed to be replaced per every predetermined driving period.

Furthermore, in a passage 148 between the nitrogen gas generator 140 and the second pressure accumulation tank 150 located downstream of the nitrogen gas generator 140, a check valve 149 preventing reverse flow from the second pressure accumulation tank 150 is provided. The second pressure accumulation tank 150 can be communicated with the mixer 120 via a passage 151. In the passage 151, a pressure reduction valve 152 and an on-off valve 153 are provided. The pressure reduction valve 152 reduces a pressure of a pressurized nitrogen gas accumulated in the second pressure accumulation tank 150 The on-off valve 253 is opened only while the engine is in operation for supplying the predetermined pressure of pressurized nitrogen gas to the mixer 120. For this purpose, the on-off valve 153 is a pressure actuated valve to introduce the pressure of the passage 137 via a passage 154 for receiving a pressure upstream of the nitrogen gas generator 140 as a pilot pressure.

Furthermore, in the passage 151, a flow rate control valve 155 is provided downstream of the on-off valve 153 and upstream of the mixer 120. The flow rate control valve 155 is arranged together with a fuel injection device 111 per an engine cylinder of the engine body 110 and open degree of the valve 155 is controlled depending upon a depression amount of an accelerator pedal 105. In engines, in which an intake air flow rate is not significantly varied, such as a stationary engine for electric power generation or a kind of engine for a construction machine, a nitrogen gas higher than or equal to a predetermined concentration may be supplied in a predetermined amount. Therefore, a flow rate control valve can be omitted.

On the other hand, the reference numeral 160 denotes an exhaust passage, which is communicated with the engine body 110 via an exhaust manifold 162. At intermediate positions, a turbine 164 of the turbocharger, a black smoke removing device 166 and muffler 168 are provided. In the black smoke removing device 166, separated oxygen separated from the nitrogen gas generator 140 is supplied via a passage 169.

The reference numeral 170 denotes a gear box connected to the engine body 100. In the shown embodiment, the gear box 170 is provided with a power take out (PTO) mechanism and can drive the compressor 132. The compressor 132 may be driven by another drive source such as an electric motor. Type of the compressor 132 is not limited to a particular type. However, by employing a screw compressor, it becomes possible to obtain the predetermined pressure of compressed air can be obtained in the first pressure accumulation tank 135 instantly after starting up. Therefore, the screw compressor is preferred for capability of supplying the compressed air with stable pressure. Since a track or the like has a sufficient space around the gear box 170, the compressor 132 may be installed with rigidly securing on the gear box 170 or the like together with the first pressure accumulation tank 135.

Next, detailed construction of the shown embodiment of the nitrogen gas generator, 140 will be described. The nitrogen gas generator 140 includes a body casing 141 having generally quadrangular section of 135 mm in one edge, for example, and about 1000 mm of the main body in entire length, for example, and a membrane unit casing 142 provided within the body casing 141, being in substantially circular cross section of about 100 mm in diameter in the main body portion, for example, and about 900 mm in overall length, for example.

In the membrane unit casing 142, a membrane unit 143 consisted of a flux of a plurality of high polymer hollow fiber membranes is received in a cylindrical main body portion 142a in such a manner that an inlet space 142b is defined at an inlet end of the membrane unit 143 and an outlet space 142c is defined at an outlet end thereof. Furthermore, the membrane unit casing 142 has a cylindrical inlet portion 142d communicated with the inlet space 142b and formed in a smaller diameter than the cylindrical main body 142a. The cylindrical inlet portion 142d is connected to the passage 137 via an appropriate connecting member through an inlet opening 141a at an end wall of the body casing 141. A communication cylinder 142e connected to a communication opening formed in a peripheral wall of the cylindrical main body portion 142a of the membrane unit casing 142, is connected to the passage 169 set forth above through the body casing 141.

Furthermore, at the outlet end of the outlet space 142c of the membrane unit casing 142, a cylindrical partitioning wall 144 fixed to the end wall of the body casing 141 is connected for preventing leakage of the nitrogen gas into the body casing 141. The membrane unit casing 142 is thus fixed to the body casing 141. Then, in the cylindrical partitioning wall 144, a plate-like adjusting member 145 is provided for adjusting an opening area of an outlet 142f of the outlet space 142c of the membrane unit casing 142.

The adjusting member 145 is supported by bolts 146 (three in this embodiment) threaded with the end wall of the body casing 141. By varying a threading amount of the bolts, the position of the adjustment member 145, namely the open area of the outlet 142f of the outlet space 142c can be adjusted. It should be noted that the foregoing passage 148 is connected to the opening 141b of the end wall of the body casing 141.

The nitrogen gas generator 140 in this embodiment is a so-called membrane type and is a system utilizing deferent permeability between molecules in high polymer thin membrane. This type of the nitrogen gas generator 140 has few movable portion, compact and superior in maintenance ability, and thus is suitable for mounting on a vehicle. The high polymer membrane is formed as high polymer hollow fiber membrane for transmitting oxygen externally using a pressure difference between inner surface and outer surface to selectively separating nitrogen therein In the shown embodiment, the membrane unit 143 is consisted of a flux of a plurality of high polymer hollow fiber membranes. Oxygen is transmitted externally through the membrane unit 143 and is supplied to the black smoke removing device 166 through the communication cylinder passage 142e connected to the connection opening formed in the peripheral wall of the cylindrical main body 142a and the passage 169. Then, only nitrogen gas selectively separated is fed to the second pressure accumulating tank 150 via the outlet 142f of the outlet space 142c of the membrane unit casing 142.

It should be noted that as the nitrogen gas generating device 130, in place of the membrane type nitrogen gas generator 140, a nitrogen gas cylinder including a liquid nitrogen tank or a psa (pressure swing adsorption) may be employed.

The psa is a system for taking out only a necessary component using adsorbent and utilizing difference of adsorbing ability of molecules or difference of molecular size. Two adsorbent containers are used. Pressurized air is supplied to one of the adsorbent containers so as to switch to the other adsorbent container when an adsorbed amount of the one adsorbent container is in saturated condition. Then, when the saturated adsorbent container is reduced in pressure, the nitrogen gas adsorbed in the adsorbent (normally, molecular sieving carbon is employed) is re-generated for use.

On the other hand, the foregoing nitrogen gas cylinder or psa have particular problems and thus is restricted in application. Namely, since a usable amount or time is limited in the case of the nitrogen gas cylinder, it is not suitable for a vehicle mounting application, but is useful in the case of stationary type engines. On the other hand, psa can generate high purity nitrogen gas up to 99.99% at the maximum. However, in order to certainly obtain the predetermined flow rate of the nitrogen gas, a large size container is required. Moreover, for insufficiency of durability for vibration, it is not suitable for a vehicular application. However, psa is useful for stationary type engines.

The black smoke removing device 166 is constructed with a heat resistant container including a plurality of titanium alloy ball formed by rounding to have fine passage network of thin wire-like titanium alloy (e.g. alloy of titanium and aluminum). Into this container, oxygen is supplied through the passage 169. Since titanium alloy has heat accumulation characteristics, even by passing the exhaust gas through this container, the exhaust gas temperature is elevated. For example, the exhaust gas temperature from the engine during idling condition is about 200° C. When the exhaust gas passes through this container, the temperature of the exhaust gas becomes about 350° C. Here, in the shown embodiment, in the black smoke removing device 166, oxygen is supplied. Thus, the exhaust gas temperature is elevated up to about 500° C. to burn particulates in the black smoke to significantly reduce the discharge amount of the black smoke.

Here, operation of the shown embodiment constructed as set forth above will be explained.

Associating with turning ON of not shown starter switch, air and fuel are supplied to the engine body 110 in a known manner to start engine revolution. At the same time, the compressor 132 is driven and the predetermined pressure (e.g. 784 kPa) of the compressed air is accumulated in the first pressure accumulating tank 135. It should be noted that, upon re-starting of the engine, compressed air is accumulated in the first pressure accumulating tank 135.

The compressed air accumulated in the first pressure accumulation tank 135 is introduced into the nitrogen gas generator 140 through the on-off valve 138 in an open condition. Then, by means of the membrane unit 143 in the nitrogen gas generator 140, nitrogen and oxygen are separated from each other. The predetermined concentration of nitrogen gas removed oxygen is accumulated at a predetermined pressure (e.g. 686 kPa) in the second pressure accumulation tank 150 via the check valve 149. Then, the pressure of the nitrogen gas is reduced to the predetermined pressure (e.g. 490 kPa) by the pressure reduction valve 152 to be fed to the mixer 120 through the on-off valve 153 in an open condition and the flow rate control valve 155.

Then, in the mixer 120, the nitrogen gas is mixed with the intake air introduced through the air filter 114 and is compressed by the compressor 118 of the turbocharger to be supplied to the engine body 110. It should be noted that the oxygen separated in the nitrogen gas generator 140 is supplied to the black smoke removing device 166 via is the passage 169 as set forth above.

When the engine is stopped, the compressor 132 is also stopped. In this case, since the on-off valve 138 is closed, in cooperation with the function of the check valve 134, the predetermined pressure of compressed air is accumulated in the first pressure accumulation tank 135. On the other hand, in the second pressure accumulation tank 150, associating with closing of the on-off valve 138, the on-off valve 153 taking the pressure of the passage 137 downstream of the on-off valve 138 as the pilot pressure, is also closed. Then, together with the function of the check valve 149, the predetermined pressure of the pressurized nitrogen gas is accumulated in the second pressure accumulation tank 150. Therefore, at subsequent re-starting, the predetermined amount of the nitrogen gas is instantly supplied from the second pressure accumulation tank 150 to be mixed with the intake air.

Here, a necessary nitrogen gas amount required for adapting the nitrogen oxide reduction regulation, has been found to be preferably in an amount for establishing oxygen versus nitrogen ratio of about 17:83 in the combustion chamber of the engine by supplying the predetermined amount of the nitrogen gas for the normal intake air (atmospheric air) having oxygen versus nitrogen ratio of 21:79, from experiments. The necessary nitrogen gas amount, namely the predetermined nitrogen gas amount is about 100 to 500 liters per minute from the idling condition where the intake air flow rate is minimum to the high speed and high load condition where the intake air flow rate is maximum, while it is variable depending upon engine displacement, engine speed, load and presence or absence of turbocharger and so forth, assuming that the concentration of the nitrogen gas is greater than or equal to 90%, and the engine with a turbocharger has about 5000 cc of displacement. It should be noted that in the engine having smaller displacement, required amount of the nitrogen gas becomes smaller. However, since the engine for the construction machine or the like requires large torque, it generally has large engine size.

In short, the predetermined nitrogen gas amount is a nitrogen gas amount to establish a ratio of about 0.05 when an intake air flow rate determined by the engine displacement and engine speed is 1 in the case of natural aspiration engines. On the other hand, in the case of the engine with the turbocharger, in a no-load condition, the nitrogen gas may be supplied in substantially the same ratio as the normal aspiration engine. Upon increasing of the load, in consideration of increasing of the intake air flow rate by boosting by the turbocharger, the absolute amount may be increased while ratio becomes smaller. In the case of the engine with the turbocharger having displacement of 5000 cc, the nitrogen gas: amount becomes 500 liters per minute at high speed and high load condition (2200 rpm, 100% load) where the intake air flow rate becomes maximum.

Then, in order to certainly provide a nitrogen gas amount required by the engine for adapting to the nitrogen oxide reduction regulation, it is important that predetermined concentration of the nitrogen gas can be obtained in the nitrogen gas generating device 130 and the predetermined amount of the obtained predetermined concentration of the nitrogen gas can be supplied in compliance with the operating condition of the engine as set forth above.

Accordingly, in order to obtain the predetermined concentration of the nitrogen gas, in one embodiment of the present invention, the pressure of the compressed air to be supplied to the nitrogen gas generator 140 is set to be higher at about 784 kPa (8 atm), and by providing the adjusting member 145 for adjusting the opening area of the outlet 142f of the membrane unit casing 142 to maintain the output pressure of the membrane unit casing 142 at about 490 kPa. The adjusting member 145 is a stationary regulator, it has to be adjusted depending upon individual differences per individual engines, required nitrogen gas amount per kind of the engine.

Therefore, in another embodiment, immediately following the outlet of the membrane unit casing 142, a pressure reduction valve 152 is provided in place of the adjusting member 145, for maintaining the outlet pressure of the membrane unit casing 142 at about 490 kPa. However, in the embodiment where the pressure reduction valve 152 is provided in place of the adjusting member 145, similarly to the embodiment providing the adjusting member 145, oxygen separation performance in the membrane unit 143 is lowered in the vicinity of the outlet for lowering of pressure due to loss in the vicinity of the outlet of the membrane unit casing 142. Therefore, it is not preferred to obtain high concentration nitrogen gas since extra flow rate becomes necessary for lower concentration.

Accordingly, in a further embodiment of the present invention, the second pressure accumulation tank 150 is provided between the outlet of the membrane unit casing 142 and the pressure reduction valve 152 and the pressure in the second pressure accumulation tank 150 is set at about 686 kPa. The pressure of the membrane unit 143 is maintained to have a pressure drop about 0.490 kPa by oxygen separation to improve oxygen separation performance to obtain the nitrogen gas of higher concentration.

On the other hand, in order to supply thus obtained nitrogen gas of predetermine concentration in the predetermined amount adapting to the driving condition of the engine, the present invention employs the pressurized nitrogen gas. In the shown embodiment, the nitrogen gas of the pressure lowered down to about 490 kPa by the pressure reduction valve 152, is supplied to the mixer 120.

(Results of Experiments)

The cases where the present invention is employed and not employed, comparison experiments were performed. The results are as follows.

Experiment 1)

Employing an engine of Mitsubishi Heavy Industries Ltd. (Type: 6D34-TE1, displacement: 5861 cc, with turbocharger), the nitrogen gas of about 89% in concentration is supplied at 100 liters per minute. Reduction ratio of nitrogen oxide is shown in the following table 1.

TABLE 1

|  | Nitrogen Oxide | |
|---|---|---|
|  | Idling | 2000 r.p.m. |
| System Not provided | 101 vol ppm | 172 vol ppm |
| System Provided | 80 vol ppm | 153 vol ppm |
| Reduction Ratio | 21% | 11% |

Experiment 2)

Employing an engine of Mitsubishi Heavy Industries Ltd. (Type: 6D34-TE1, displacement exhaust amount: 5861 cc, with turbocharger), the nitrogen gas of about 98.5 concentration is supplied at 100 liters per minute. Reduction ratio of nitrogen oxide is shown in the following table 2.

TABLE 2

|  | Nitrogen Oxide | |
|---|---|---|
|  | Idling | 2000 r.p.m. |
| System Not Provided | 188 vol ppm | 219 vol ppm |
| System Provided | 126 vol ppm | 188 vol ppm |
| Reduction Ratio | 32% | 14% |

Experiment 3)

Employing an engine of Isuzu Motor Co. Ltd. (Type: 4BDI, displacement: 4100 cc, with turbocharger), the nitrogen gas of about 93% in concentration is supplied at 220 liters per minute. Reduction ratio of nitrogen oxide is shown in the following table 2.

TABLE 3

|  | Nitrogen Oxide | |
|---|---|---|
|  | Idling | 2000 r.p.m. |
| System Not Provided | 172 vol ppm | 375 vol ppm |
| System Provided | 57 vol ppm | 274 vol ppm |
| Reduction Ratio | 67% | 27% |

It should be noted that the foregoing experiments 1) to 3) were performed by Shikoku Keisoku Kogyo K. K. Experiments 4) to 6).

Figure 4:
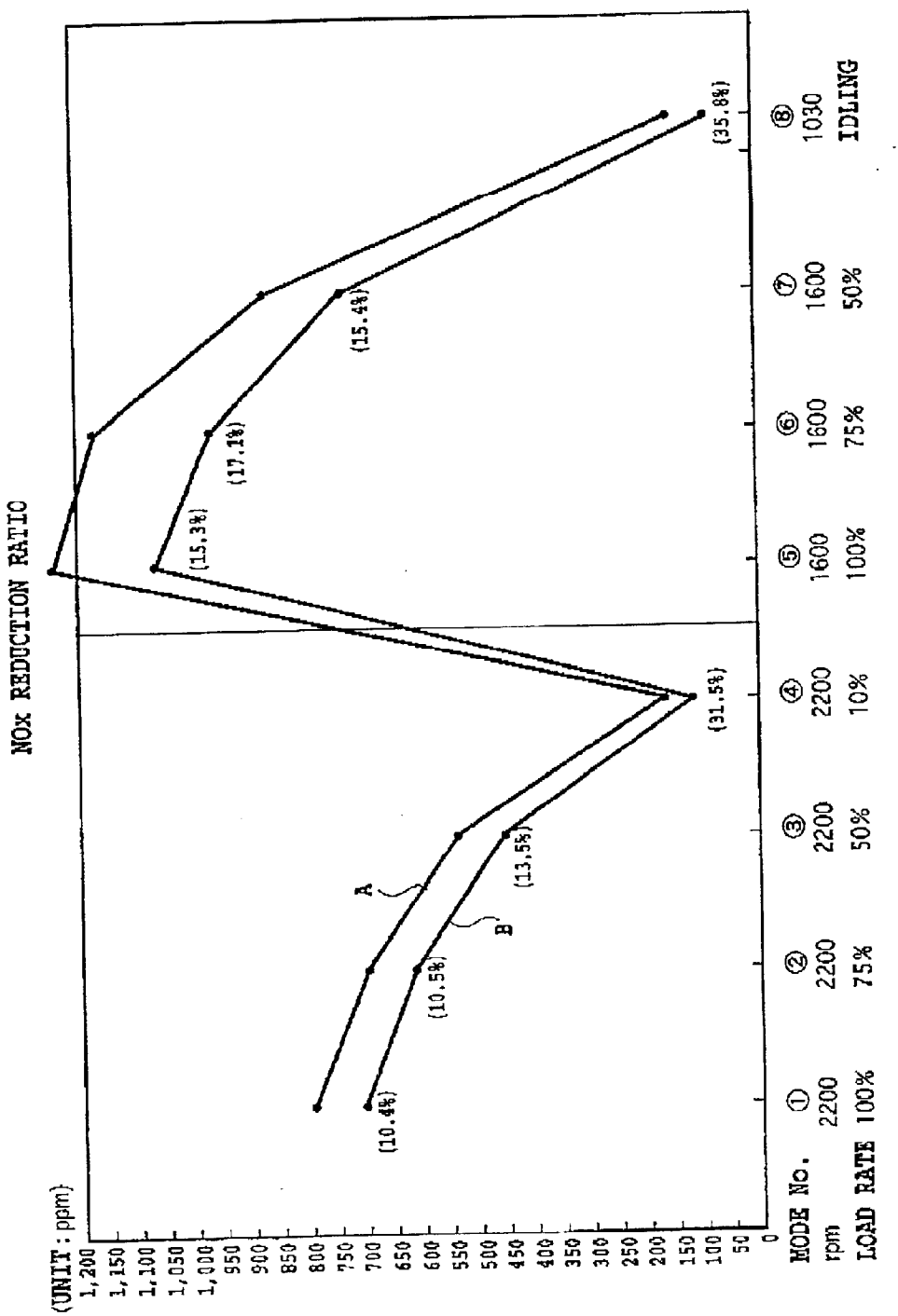
FIG. 4 is a graph showing a result of measurement in eight modes as experiment 4 employing the nitrogen oxide reducing system according to the present invention.
Figure 5:
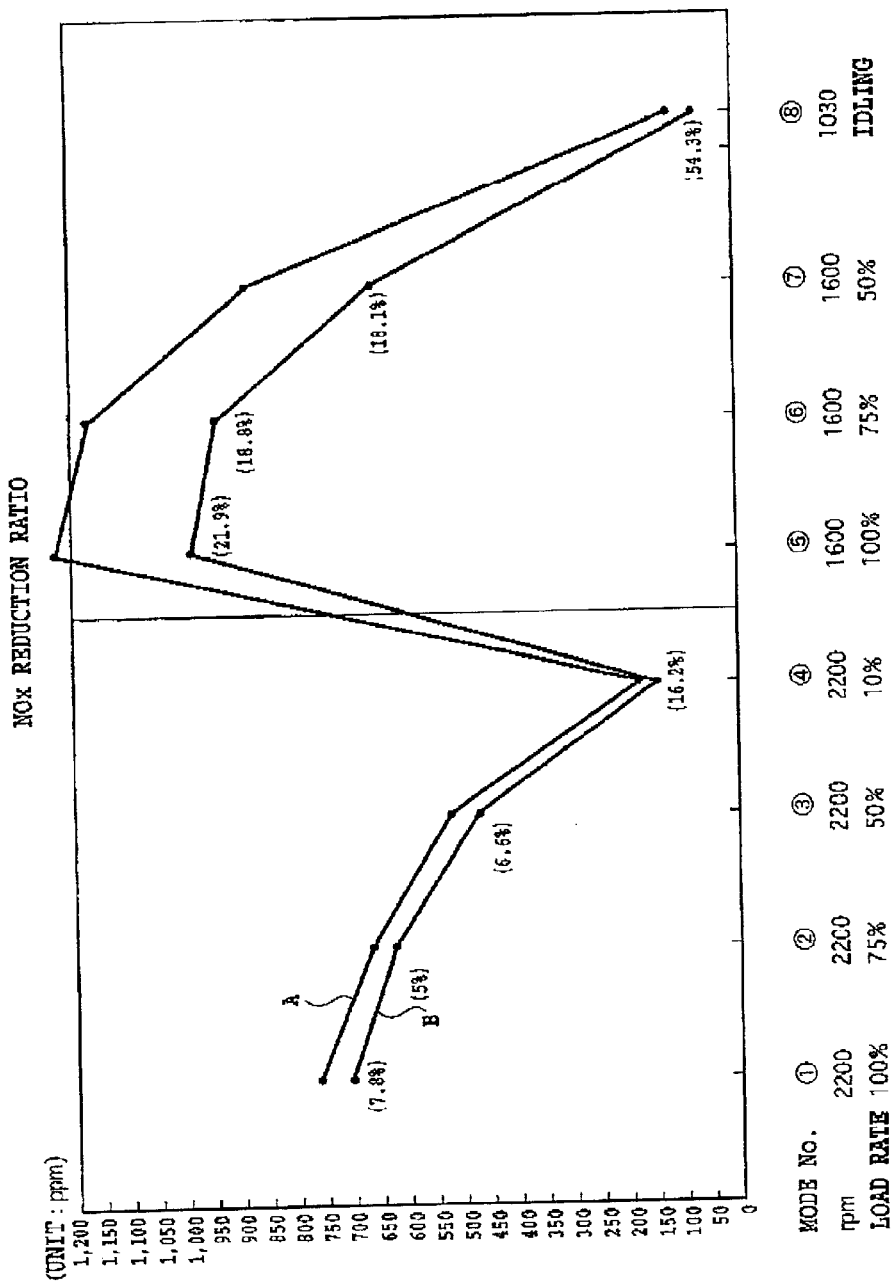
FIG. 5 is a graph showing a result of measurement in eight modes as experiment 5 employing the nitrogen oxide reducing system according to the present invention.
Figure 6:
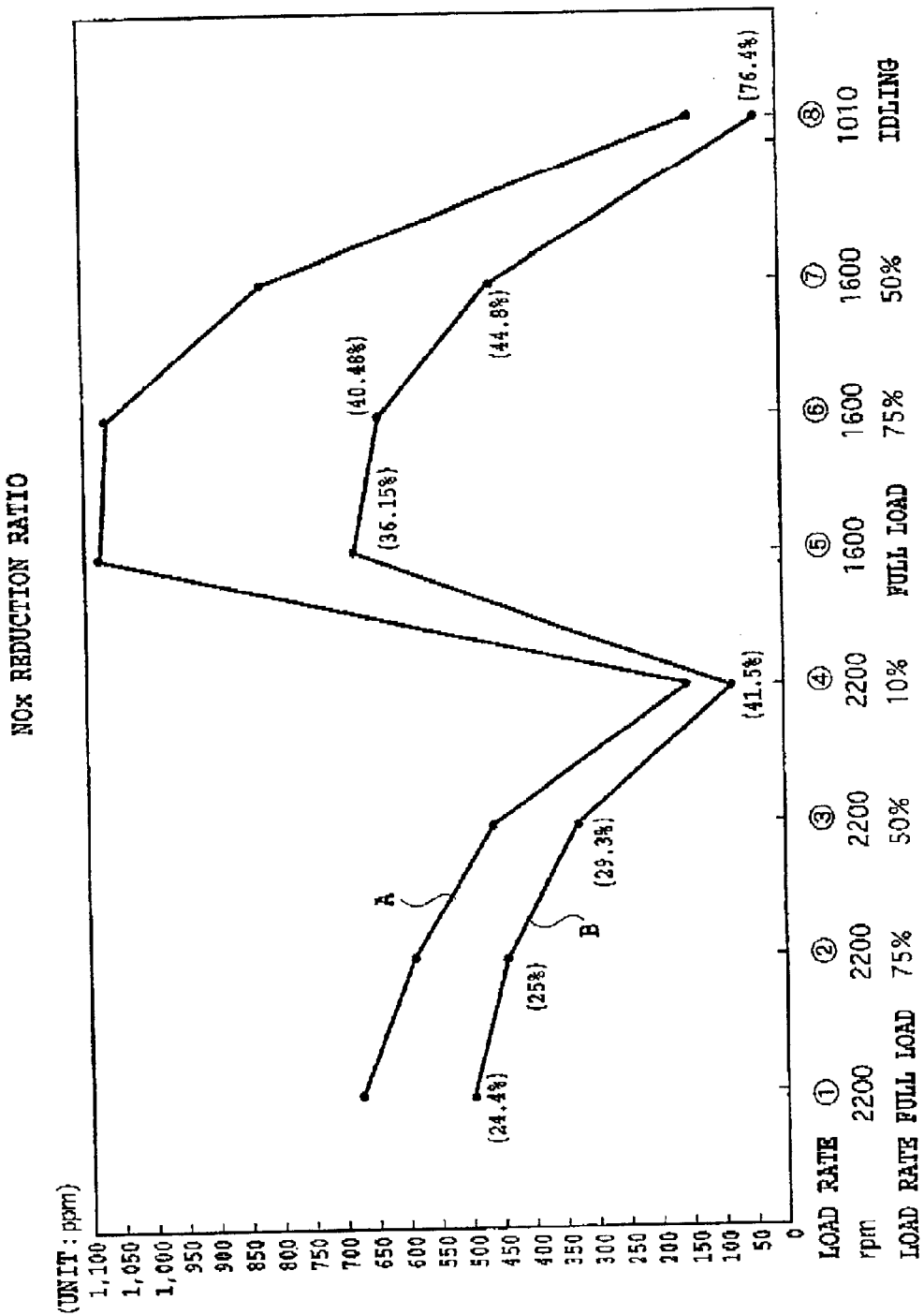
FIG. 6 is a graph showing a result of measurement in eight modes as experiment 6 employing the nitrogen oxide reducing system according to the present invention.

Employing an engine of Komatsu Ltd. (Type; SAA6D95L, displacement; 4890 cc, with turbocharger and intercooler), for Experiment 4) the nitrogen gas of about 90% in concentration is supplied at 110 liters per minute, for Experiment 5) the nitrogen gas of about 91.5% in concentration is supplied at 120 liters per minute, and for Experiment 6) the nitrogen gas of about 95% in concentration is supplied at 350 liters per minute. Experiments were performed for measurement in eight modes in Japan Automobile Research Institute. In the experiments 4) to 6), variation of nitrogen oxide discharge amount in the cases where the system of the present invention is employed and not employed are shown in graphs of FIGS. 4 to 6. In the graphs of FIGS. 4 to 6, line A shows the case where the system of the present invention is not employed and line B shows the case where the present invention is employed. In the graphs, number in parenthesis is nitrogen oxide reduction ratio in respective mode.

Average reduction ratio in eight modes in the experiments 4) to 6) are shown in the following table 4.

| | 8 Modes Nitrogen Oxide Total Discharge Amount | | |
|---|---|---|---|
| | Experiment 4 | Experiment 5 | Experiment 6 |
| No System | 5608.4 ppm | 5537.3 ppm | 4982.9 ppm |
| System Present | 4755.2 ppm | 4643.6 ppm | 3173.9 ppm |
| Ave. Reduction | 18.68% | 18.58% | 39.76% |

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A nitrogen oxide reducing system for a diesel engine comprising:
   a mixer provided in an induction passage of the diesel engine; and
   a nitrogen gas generating device supplying a pressurized nitrogen gas of more than or equal to a predetermined concentration in a predetermined amount relative to an intake air flow rate,
   wherein said nitrogen gas generating device is a nitrogen gas cylinder filled with nitrogen gas at a predetermined pressure or a psa type nitrogen gas generator.

2. A nitrogen oxide reducing system for a diesel engine comprising:
   a mixer provided in an induction passage of the diesel engine; and
   a nitrogen gas generating device supplying a pressurized nitrogen gas of more than or equal to a predetermined concentration in a predetermined amount relative to an intake air flow rate,
   wherein said nitrogen gas generating device includes a compressor for compressing air, a first pressure accumulation tank, accumulating compressed air at a predetermined pressure, and a nitrogen gas generator having a membrane unit having a plurality of hollow fiber membranes for selectively transmitting oxygen from the compressed air supplied from said first pressure accumulation tank for separation to discharge a nitrogen gas of greater than or equal to a predetermined concentration.

3. A nitrogen oxide reducing system for a diesel engine as claimed in claim 2, wherein said nitrogen gas generating device includes a check valve at a position upstream of said first pressure accumulation tank and an on-off valve positioned between said first pressure accumulation tank and said nitrogen gas generator.

4. A nitrogen oxide reducing system for a diesel engine as claimed in claim 2, wherein said nitrogen gas generator has a pressure and flow rate adjusting means for adjusting a pressure and flow rate of said nitrogen gas to be discharged, on an outlet side downstream of said membrane unit.

5. A nitrogen oxide reducing system for a diesel engine as claimed in claim 2, wherein said nitrogen gas generating device further includes a pressure reduction valve at a position downstream of said nitrogen gas generator.

6. A nitrogen oxide reducing system for a diesel engine as claimed in claim 2, wherein said nitrogen gas generating device further includes a second pressure accumulation tank for accumulating the nitrogen gas supplied from said nitrogen gas generator at a given pressure, and a pressure reduction valve located downstream of said second pressure accumulation tank.

7. A nitrogen oxide reducing system for a diesel engine as claimed in claim 6, wherein said nitrogen gas generating device has a check valve between said nitrogen gas generator and said second pressure accumulation tank and an on-off valve between said pressure reduction valve and said mixer.

8. A nitrogen oxide reducing system for a diesel engine as claimed in claim 1,
   further comprising a flow rate control valve between said nitrogen gas generator and said mixer.

9. A nitrogen oxide reducing system for a diesel engine as claimed in claim 2, further comprising a black smoke reducing device in an exhaust passage, and wherein to said black smoke reducing device, separated oxygen is supplied from said nitrogen gas generator of said nitrogen gas generating device.

10. A nitrogen oxide reducing system for a diesel engine as claimed in claim 2,
    further comprising a flow rate control valve between said nitrogen gas generator and said mixer.

11. A nitrogen gas generating device comprising:
    a compressor for compressing air;
    a first pressure accumulation tank accumulating compressed air at a predetermined pressure; and
    a nitrogen gas generator having a membrane unit having a plurality of hollow fiber membranes for selectively transmitting oxygen from the compressed air supplied from said first pressure accumulation tank for separation to discharge a nitrogen gas of greater than or equal to a predetermined concentration.

12. A nitrogen gas generating device as claimed in claim 11, wherein said nitrogen gas generating device includes a check valve at a position upstream of said first pressure accumulation tank and an on-off valve positioned between said first pressure accumulation tank and said nitrogen gas generator.

13. A nitrogen gas generating device as claimed in claim 11, wherein said nitrogen gas generator has a pressure and flow rate adjusting means for adjusting a pressure and flow rate of said nitrogen gas to be discharged, at an outlet side downstream of said membrane unit.

14. A nitrogen gas generating device as claimed in claim 11, which further includes a pressure reduction valve at a position downstream of said nitrogen gas generator.

15. A nitrogen gas generating device as claimed in claim 11, further comprising a second pressure accumulation tank for accumulating the nitrogen gas supplied from said nitrogen gas generator at a given pressure, and a pressure reduction valve located downstream of said second pressure accumulation tank.

16. A nitrogen gas generating device as claimed in claim 15, further comprising:
    a check valve between said nitrogen gas generator and said second pressure accumulation tank and an on-off valve downstream of said pressure reduction valve.

* * * * *